Figure 1:
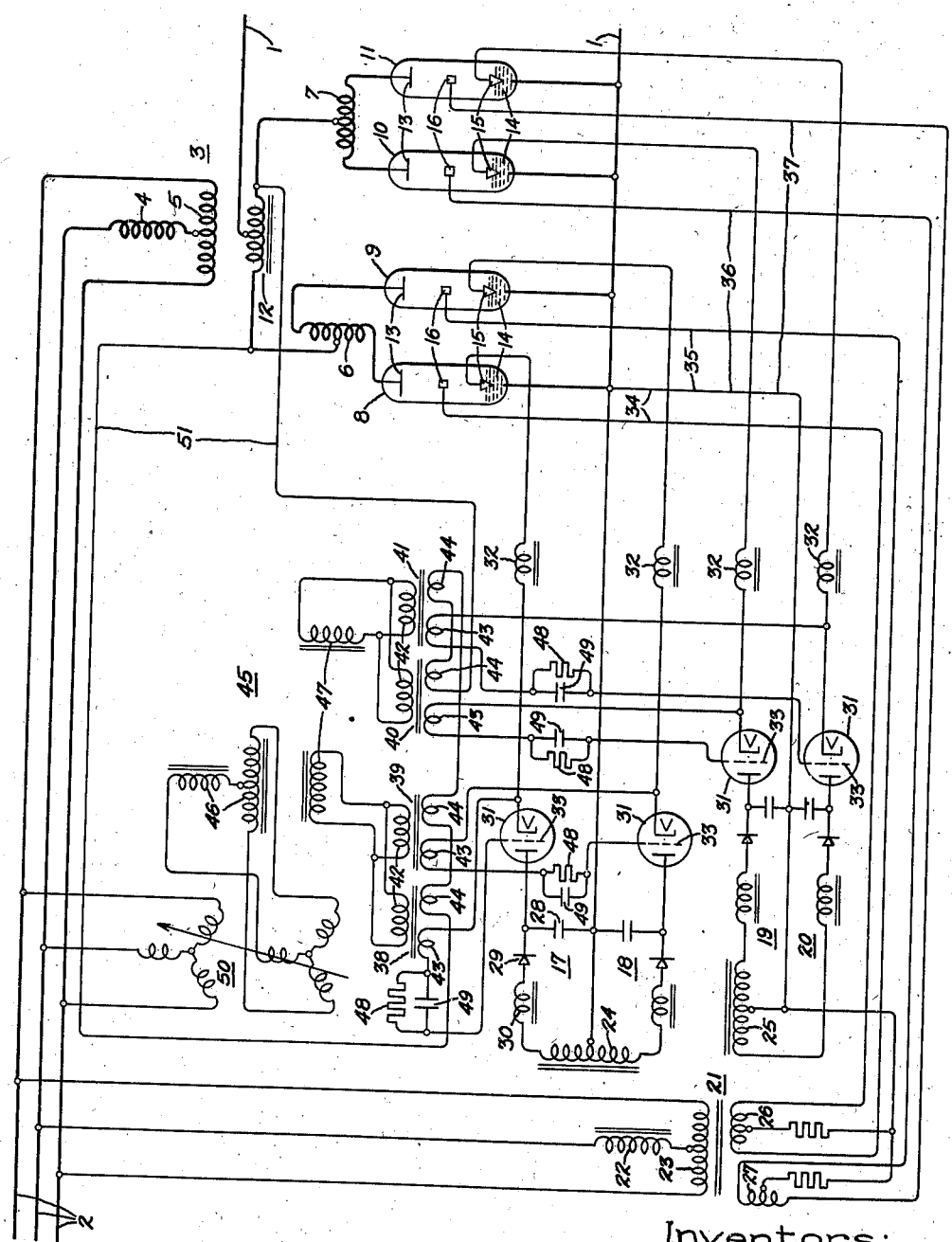

Dec. 23, 1941.    M. A. EDWARDS ET AL.    2,267,398
ELECTRIC VALVE CONTROL CIRCUITS
Filed July 5, 1940    2 Sheets-Sheet 2

Inventors:
Martin A. Edwards,
Orrin W. Livingston,
by Harry E. Dunham
Their Attorney.

Patented Dec. 23, 1941

2,267,398

UNITED STATES PATENT OFFICE 2,267,398

ELECTRIC VALVE CONTROL CIRCUITS

Martin A. Edwards, Scotia, and Orrin W. Livingston, Schenectady, N. Y., assignors to General Electric Company, a corporation of New York Application July 5, 1940, Serial No. 343,966

9 Claims. (Cl. 175—363)

Our invention relates to electric valve translating systems and more particularly to systems comprising electric valve means of the type employing immersion-ignitor control members.

Electric valve translating apparatus using electric discharge devices or electric valves of the type comprising an ionizable medium and immersion-ignitor control members have found ready application in industrial processes and in electric power translating and distribution systems. It is important in apparatus of this nature to provide apparatus susceptible of effecting positive control of the electric valve means and coincidentally to lessen the duty imposed on the control members without sacrificing the necessary precision of control. In accordance with the teachings of our invention described hereinafter, we provide new and improved translating apparatus for controlling electric valves of this nature and which offers flexibility of control not provided by arrangements devised heretofore.

It is an object of our invention to provide new and improved electric valve translating apparatus.

It is another object of our invention to provide new and improved control or excitation circuits for electric valve translating apparatus of the type employing an ionizable medium and immersion-ignitor control members.

It is a further object of our invention to provide new and improved control or excitation circuits for electric valve translating apparatus whereby electric valves of the type employing immersion-ignitor control members may be employed to energize load circuits having peculiar characteristics, such as direct current load circuits, which impose intermittent loads on supply systems.

Briefly stated, our invention is diagrammatically illustrated in several embodiments as applied to electric valve systems for energizing a direct current load circuit from an alternating current supply circuit through electric valves of the type employing an ionizable medium and having immersion-ignitor control members. Each of the electric valve means is provided with an auxiliary electrode which acts as an arc-maintaining electrode after the initiation of arc discharges by the immersion-ignitor control member. Impulse generating means are provided for transmitting impulses of current to the immersion-ignitor control member to render the electric valve means conductive, and suitable control means is provided for controlling or adjusting the time of occurrence of the current impulses relative to the voltage of the alternating current circuit, thereby controlling the output voltage or current of the electric valves. The phase of the potential supplied to the auxiliary electrodes is such that suitable arc-maintaining potential is available throughout the latter portion of positive half cycles of anode-cathode voltage so that the arc may be maintained when the electric valve means is operating within the reduced voltage region. Furthermore, this phase displacement will assure the maintenance of arc discharges within the respective electric valve means in the event the load circuit demands intermittent load current, in this manner providing at all times a source of current immediately upon demand by the load circuit.

Figure 2:
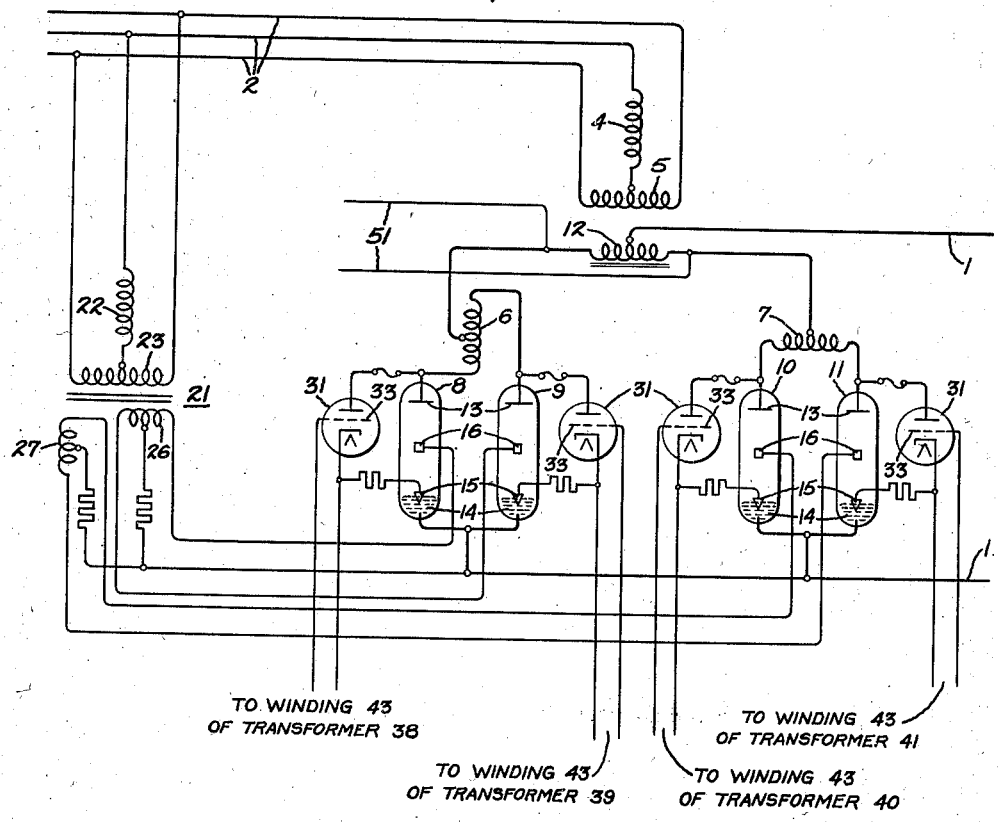

For a better understanding of our invention, reference may be had to the following description taken in connection with the accompanying drawings and its scope will be pointed out in the appended claims. Fig. 1 diagrammatically illustrates an embodiment of our invention as applied to a polyphase rectifier in which the excitation circuit comprises a separate impulse generating means for energizing the immersion-ignitor control members, and Fig. 2 represents a modification of the arrangement shown in Fig. 1 but in which the impulses of current for the immersion-ignitor control member are derived from the anode-cathode circuits of the main or power electric valves through control electric discharge devices.

Referring now to Fig. 1 of the accompanying drawings, we have there illustrated our invention as applied to an electric valve translating system for energizing a load circuit, such as a direct current load circuit 1, from an alternating current supply circuit 2 through translating apparatus comprising a transformer 3 having primary windings 4 and 5 and secondary windings 6 and 7. Electric valve means 8—11 are also provided and are arranged in two groups, or two translating units, through the interconnection of secondary windings 6 and 7 by means of an interphase transformer 12. The specific translating system shown in Fig. 1 is a quarter-phase system afforded by the usual Scott or T-connection of the primary windings 4 and 5. Electric valve means 8—11 are of the type employing an ionizable medium, such as a gas or a vapor, and each includes an anode 13, a mercury pool cathode 14, an immersion-ignitor control member 15 and an auxiliary electrode 16. The immersion-ignitor control members 15 are constructed of a material such as boron-carbide or silicon-carbide having an electrical resistivity substantially greater than that of the associated mercury and are effective to initiate arc discharges within the electric valve means upon the transmission of a predetermined minimum current between the control members 15 and the associated cathodes 14. Of course, where mercury is used as the cathode, the ionizable medium is mercury vapor.

We employ a plurality of control or excitation circuits 17—20 associated with electric valves 8—11, respectively, and which transmit to the control members 15 impulses of current of the proper magnitude to render the electric valve means conductive. Excitation circuits 17—20 may be energized from secondary windings 24 and 25 of a Scott-connected transformer 21 which is in turn connected to be energized from the alternating current circuit 2. Each of the excitation circuits 17—20 comprises a capacitance 28 which is charged from the associated portion of the secondary winding 24 or 25 through a suitable unidirectional conducting device such as a contact rectifier 29 and an inductance 30. The impulses of current supplied to the control members 15 are generated by the discharges of the capacitances 28 through electric discharge devices 31 and inductances 32. The electric discharge devices 31 are preferably of the type employing an ionizable medium such as a gas or a vapor and each comprises a control member or grid 33 which determines the time during the cycle of voltage of circuit 2 at which the associated capacitance 28 is discharged. The inductances 32 serve as a means for transmitting impulses of current of short duration to the control members 15 inasmuch as the inductances serve to render the discharge device 31 nonconducting at the end of the periods of discharge of the capacitances 28. Inductances 32 also serve to limit the rate of rise of the control member currents.

We provide a plurality of circuits 34—37 connected to the auxiliary electrodes 16 of electric valve means 8—11 respectively, for supplying thereto suitable arc-maintaining potentials. The phase of the alternating potentials supplied to the auxiliary electrodes 16 is preferably displaced with respect to the anode-cathode voltages of the associated electric valve means. We have found that in quarter-phase systems the arc-maintaining potentials may be displaced by substantially 90 electrical degrees in a lagging relation with respect to the associated anode-cathode voltages by connecting the auxiliary electrode 16 to secondary windings 26 and 27, respectively, of the Scott-connected transformer 21 which is provided with primary windings 22 and 23 connected in the usual manner to provide a quarter phase system of control voltages.

As a means for rendering the electric discharge devices 31 conductive precisely at predetermined times during cycles of anode-cathode voltage of electric valve means 8—11, we provide a plurality of saturable inductive peaking devices or transformers 38—41, inclusive. The transformers 38—41 may be of similar construction and arrangement and each comprises a primary winding 42, a secondary winding 43 in which there is induced an alternating voltage of peaked wave form and a control winding 44 the function of which will be explained hereinafter. Primary windings 42 may be energized from a Scott-connected transformer 45 having primary windings 46 and secondary windings 47. Suitable means are provided for impressing on the grids 33 of electric discharge devices 31 negative unidirectional biasing potentials. Self-biasing means, such as groups of parallel connected resistances 48 and capacitances 49, may be employed.

In order to control the phase of the periodic voltages of peaked wave form impressed on grids 33 of electric discharge devices 31 independently of the phase of the voltages impressed on the auxiliary electrodes 16, we provide a suitable phase shifting device such as a rotary phase shifter 50 connected between the alternating current circuit 2 and primary windings 46 of transformer 45. By operating the phase shifter 50 the time during the cycles of anode-cathode voltage at which the electric valve means 8—11 are rendered conductive may be controlled.

We provide a circuit 51 for energizing control windings 44 of transformers 38—41 in response to the currents conducted by the respective pairs of electric valves 8, 9 and 10, 11 to maintain a predetermined or equal distribution of load current between the two translating units comprising the respective pairs. The circuit 51 is energized in response to the voltage appearing across the interphase transformer 12 in a manner disclosed and broadly claimed in a copending joint patent application of C. H. Willis and M. A. Edwards, Serial No. 332,974, filed May 22, 1940, and which is assigned to the assignee of the present application.

The operation of the embodiment of our invention shown in Fig. 1 will be explained by considering the system when it is operating as a polyphase rectifier to transmit direct current to the load circuit 1. The electric valve means 8—11, upon being rendered conductive, conduct current to the load circuit in a predetermined order. The interphase transformer 12 serves to cause the two translating units comprising the pairs of electric valve means 8, 9 and 10, 11 to conduct current in parallel; that is, each electric valve conducts current during 180 electrical degrees but for only 90 electrical degrees with any one valve in the other group or pair.

The magnitude of the voltage impressed across the direct current circuit 1 when the system is operating as a rectifier is, of course, increased as the time of initiation of the arc discharge is advanced towards the zero point of the positive half cycles of applied anode-cathode voltage. Conversely, the voltage impressed across the load circuit is decreased as the time of initiation of the discharges is retarded.

The electric valve means 8—11 are rendered conductive by the transmission of a predetermined current to the control members 15 by the excitation circuits 17—20, respectively. Considering electric valve means 8 and its associated excitation circuit 17 more particularly, the capacitance 28 is charged from the upper portion of winding 24 through rectifier 29 and inductance 30. At a predetermined time established by the setting of the rotary phase shifter 50, the periodic voltage or alternating voltage of peaked wave form produced by secondary winding 43 of transformer 38 render electric discharge device 31 conducting. The discharge circuit of capacitance 28 includes inductance 32 and control member 15 of electric valve means 8, thereby establishing a cathode spot on cathode 14. Upon the establishment of an arc discharge within the electric valve means 8, the auxiliary electrode 16 assures the maintenance of an arc discharge within the electric valve means throughout the remaining portion of the positive half cycle of applied anode-cathode voltage even though the characteristics of the load circuit are such that load current is not continuously demanded during that time interval. In this manner a suitable source of direct current is available at all times for supplying the direct current circuit 1 even though only a single impulse of energizing current of short duration has been transmitted to the control member 15 of electric valve means 8. The capacitance 28 discharges rapidly and at the end of the discharge period, the inductance 32 serves to render the electric discharge device 31 non-conductive so that the capacitance 28 is recharged and made ready for the next operation.

The phase of the impulses of current transmitted to the control members 15 may be controlled or adjusted by means of the rotary phase shifter 50 which controls the phase of the alternating voltages supplied to primary windings 42 of transformers 38—41. This phase controlling or adjusting means is independent of the arc-maintaining potentials impressed on the auxiliary electrodes 16 by means of circuits 34—37. Inasmuch as the phase of the arc-maintaining potentials is independent of the phase controlling means but of fixed relationship with respect to the anode-cathode voltages of electric valve means 8—11, there is provided a suitable arrangement for assuring the maintenance of an arc discharge within the electric valve means throughout at least the remainder of the positive half cycles of anode-cathode voltage after the transmission of the arc initiating impulse through the control member 15. In the quarter-phase system illustrated, by virtue of the relation between windings 6 and 7 and windings 26 and 27, if the arc discharge is initiated at the 90 degree point of the positive half cycle of applied anode-cathode voltage, it will be apparent that the auxiliary electrodes 16 will maintain arc discharges within the electric valve means for 180 electrical degrees.

While in the embodiment of our invention illustrated in Fig. 1 the arc-initiating potentials are illustrated as being displaced 90 electrical degrees with respect to the associated anode-cathode voltages, it will be appreciated that our invention in its broader aspects is not limited to this particular phase relationship. Other phase displacements may be employed in order to assure the arc discharges within the electric valve means for the required period. In the event a six-phase system is employed, the auxiliary electrodes 16 may be connected to associated circuits to maintain an arc discharge within the electric valve means for 120 electrical degrees and may have a phase displacement to assure the maintenance of these arc discharges in a reliable and positive manner.

Control windings 44 of transformers 38—41 adjust the phase of the periodic voltages induced in secondary windings 43 to obtain or maintain a predetermined or equal distribution of load current between the two groups of electric valve means. For example, if the electric valve means 10 and 11 tend to conduct a greater amount of current than the electric valve means 8 and 9, circuit 51 operates through control windings 44 of transformers 40 and 41 to retard the phase of the alternating voltages of peaked wave form impressed on grids 33 of electric discharge devices 31 in excitation circuits 19 and 20 and to advance the phase of the alternating voltages impressed on the grids 33 of discharge devices 31 in excitation circuits 17 and 18, thereby reestablishing the desired distribution of load.

An important advantage of our invention is the feature which permits the use of electric valve apparatus of this type in supplying load circuits where an extended range of load voltage is demanded and where the load circuit has intermittent current demanding characteristics. Inasmuch as it is preferable to transmit to the control members 15 only a single impulse of current of short duration during each cycle in order to relieve the duty imposed on the control members and to increase thereby the life of electric valve means, the maintenance of an arc discharge within the electric valve means is assured by means of the auxiliary electrodes 16 and associated circuits 34—37. Even though the direct current demanded by the load is intermittent, circuits 34—37 and the auxiliary electrodes assure the transmission of suitable current to the load instantly upon demand.

Fig. 2 diagrammatically illustrates a modification of the arrangement shown in Fig. 1. Instead of employing separate excitation circuits or impulse generating means as excitation circuit 17—20 of Fig. 1, the anode-cathode voltage of the respective electric valve means 8—11 is employed as a means for energizing the immersion-ignitor control members 15. The electric discharge devices 31 are connected between the anodes 13 and the cathodes 14, and the grids 33 thereof are connected to secondary windings 43 of transformers 38—41, respectively. Auxiliary electrodes 16 are connected to the proper secondary windings of transformer 21 and serve as means for assuring the maintenance of arc discharges within the electric valve means at least throughout the remainder of the positive half cycles of applied anode-cathode voltage.

The operation of the embodiment of our invention shown in Fig. 2 is substantially the same as that explained above in connection with the arrangement of Fig. 1. Alternating voltages of peaked wave form are supplied to grids 33 of discharge device 31 by transformers 38—41. Upon being rendered conductive, discharge devices 31 conduct current to the immersion-ignitor control members 15. As soon as arc discharges are initiated within the electric valve means, the anode-cathode voltages decay to a small value corresponding to the voltage across the arc, and the arc is maintained by means of auxiliary electrodes 16 throughout the periods established by the voltages of windings 26 and 27.

While we have shown and described our invention as applied to particular systems of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States, is:—

1. In combination, an alternating current circuit, a direct current circuit, electric translating apparatus connected between said circuits and comprising two translating units each comprising electric valve means employing an ionizable medium capable of supporting an arc discharge and having an anode, a cathode, an immersion-ignitor control member and an auxiliary electrode impulse generating means for supplying impulses of current to the immersion-ignitor control members to render the electric valve means conductive comprising saturable inductive devices each including a primary winding energized from the alternating current circuit and including a control winding, means for supplying to the auxiliary electrodes potentials to maintain arc discharges after the initiation of discharges by the immersion-ignitor control members, means for energizing the control windings in response to the currents conducted by said translating units to control the phase relation of said impulses of current relative to the voltage of said alternating current circuit to maintain an equal distribution of current conducted by the respective units, and means for adjusting the phase of said impulses of current independently of the phase of the voltages supplied to the auxiliary electrodes.

2. In combination, an alternating current circuit, a direct current circuit, electric translating apparatus connected between said circuits and comprising a plurality of translating units each including a pair of electric valve means of the type comprising an ionizable medium capable of supporting an arc discharge and having an anode, a cathode, an immersion-ignitor control member and an auxiliary electrode, a plurality of impulse generating circuits each including a capacitance, means for charging the capacitance and a controlled electric discharge device for discharging the capacitance through the associated immersion-ignitor control member, the electric discharge devices each having a grid for rendering the device conductive, a plurality of circuits for supplying potentials to the auxiliary electrodes to maintain arc discharges initiated by the immersion-ignitor control members and each comprising a winding having terminals connected to the auxiliary electrodes of the associated pair of electric valve means and having an intermediate terminal connected to the cathodes of the associated pair, a plurality of saturable inductive peaking devices for impressing on the grids periodic voltages of peaked wave form and each comprising an alternating current winding energized from thte alternating current circuit and each having a control winding, means for energizing the control windings in response to the currents conducted by the translating units to control the phase relation of the impulses of current transmitted to the immersion-ignitor control members thereby maintaining an equal distribution of current conducted by the respective units, and means for adjusting the phase of said impulses of current independently of the phase of the voltages supplied to the auxiliary electrodes.

3. In combination, an alternating current circuit, a direct current circuit, electric translating apparatus connected between said circuits and comprising electric valve means of the type comprising an ionizable medium capable of supporting an arc discharge and each including an anode, a cathode, an immersion-ignitor control member and an auxiliary electrode, means for supplying to the auxiliary electrode an arc-maintaining potential, impulse generating means for supplying impulses of current to the immersion-ignitor control member to render the electric valve means conductive, control means for said impulse generating means to vary the time of occurrence of said impulses throughout the cycles of anode-cathode voltage, and means for displacing the phase of the potential impressed on said auxiliary electrode relative to the voltage supplied to said impulse generating means so that an arc discharge is maintained within said electric valve means throughout the entire remaining portion of the half cycles determined by the time of occurrence of said impulses.

4. In combination, an alternating current circuit, a direct current circuit, electric translating apparatus connected between said circuits and comprising a pair of electric valve means each being of the type comprising an ionizable medium capable of supporting an arc discharge and each comprising an anode, a cathode, an immersion-ignitor control member and an auxiliary electrode, impulse generating means for supplying impulses of current to the immersion-ignitor control members to render the electric valve means conductive, means for controlling the phase relation of said impulses relative to the voltage of said alternating current circuit, and means independent of the phase controlling means and the impulse generating means for supplying arc-maintaining potentials to the electrodes to maintain arc discharges within the electric valve means after the initiation of arc discharges by the immersion-ignitor control members.

5. In combination, an alternating current circuit, a direct current circuit, electric translating apparatus connected between said circuits and comprising a pair of electric valve means of the type comprising an ionizable medium capable of supporting an arc discharge and each comprising an anode, a cathode, an immersion-ignitor control member associated with said cathode and an auxiliary electrode impulse generating means for supplying impulses of current to the immersion-ignitor control members to render the electric valve means conductive, means for controlling the phase of said impulses relative to the voltage of said alternating current circuit, and means independent of the phase controlling means and the impulse generating means for supplying arc-maintaining potentials to the auxiliary electrodes to maintain arc discharges within said electric valve means after the initiation of the arc discharges by said immersion-ignitor control members and comprising a winding having terminals connected to the respective auxiliary electrodes.

6. In combination, an alternating current circuit, a direct current circuit, electric translating apparatus connected between said circuits and comprising a pair of electric valve means of the type comprising an ionizable medium capable of supporting an arc discharge and including an anode, a cathode, an immersion-ignitor control member and an auxiliary electrode, impulse generating means for supplying impulses of current to the immersion-ignitor control members to render the electric valve means conductive, control means for controlling said impulse generating means to transmit said impulses of current to the respective control members at predetermined instants during half cycles of anode-cathode voltage of said electric valve means, and means independent of the control means and said impulse generating means for supplying arc-maintaining potentials to the auxiliary electrodes to maintain arc discharges within said electric valve means after the initiation of arc discharges by said immersion-ignitor control members.

7. In combination, an alternating current circuit, a direct current circuit, electric translating apparatus interconnecting said circuits and comprising a pair of electric valve means of the type comprising an ionizable medium capable of supporting an arc discharge and including an anode, a cathode, an immersion-ignitor control member associated with said cathode and an auxiliary electrode, impulse generating means for supplying impulses of current to the immersion-ignitor control members to render the electric valve means conductive, means for supplying potentials to the auxiliary electrodes to maintain arc discharges initiated by the immersion-ignitor control members and comprising a winding having terminals connected to the respective electrodes, and means independent of the arc-maintaining means to control the time of occurrence of said impulses during the half cycles of anode-cathode voltage in order to determine the time during the half cycles at which said electric valve means are rendered conductive.

8. In combination, an alternating current circuit, a direct current circuit, electric translating apparatus connected between said circuits and comprising electric valve means of the type comprising an ionizable medium capable of supporting an arc discharge and including an anode, a cathode, an immersion-ignitor control member associated with said cathode and an auxiliary electrode, impulse generating means for supplying impulses of current to said control member to render said electric valve means conductive, and means independent of said impulse generating means for supplying to the auxiliary electrode a potential having a lagging phase relationship with respect to the associated anode-cathode voltages to assure positive maintenance of arc discharges when said electric valve means is rendered conductive during the latter portion of each cycle of the anode-cathode voltage.

9. In combination, an alternating current circuit, a direct current circuit, electric translating apparatus connected between said circuits and comprising two groups of electric valve means each comprising a pair of electric valve means of the type comprising an ionizable medium capable of supporting an arc discharge and each including an anode, a cathode, an immersion-ignitor control member and an auxiliary electrode, impulse generating means for supplying impulses of current to the immersion-ignitor control members to render the electric valve means conductive comprising saturable inductive peaking devices including primary windings energized from the alternating current circuit and including control windings, means for supplying potentials to the auxiliary electrodes of each pair of electric valve means to maintain arc discharges initiated by the immersion-ignitor control members and comprising a winding having terminals connected to the auxiliary electrodes, means for energizing said control windings in response to the currents conducted by the two groups of electric valve means for controlling the phase relation of said impulses of current relative to the voltage of said alternating current circuit to maintain an equal distribution of current conducted by the respective groups, and means for adjusting the phase of said impulses of current independently of the phase of the voltages supplied to the auxiliary electrodes.

MARTIN A. EDWARDS.
ORRIN W. LIVINGSTON.